(12) United States Patent
Diana (10) Patent No.: US 6,666,460 B2
(45) Date of Patent: Dec. 23, 2003

(54) SPRING-LOADED JOINT SEALING KEY ASSEMBLY FOR SEALING BETWEEN JOINT SEAL FACES

(75) Inventor: Stephen Anthony Diana, Albany, NY (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 09/929,124

(22) Filed: Aug. 15, 2001

(65) Prior Publication Data

US 2003/0034615 A1 Feb. 20, 2003

(51) Int. Cl.[7] ............................................... H02G 15/04
(52) U.S. Cl. ..................... 277/608; 277/628; 277/630; 277/637; 415/174.2
(58) Field of Search ................................. 277/602, 608, 277/609, 616, 628, 630, 637; 415/174.2, 135

(56) References Cited

U.S. PATENT DOCUMENTS

| | | | |
|---|---|---|---|
| 3,869,222 A | * 3/1975 | Rahnke et al. | 415/134 |
| 6,347,508 B1 | * 2/2002 | Smallwood et al. | 60/796 |
| 6,464,232 B1 | * 10/2002 | Marchi et al. | 277/630 |
| 6,464,457 B1 | * 10/2002 | Morgan et al. | 415/174.2 |

* cited by examiner

Primary Examiner—Anthony Knight
Assistant Examiner—Enoch Peavey
(74) Attorney, Agent, or Firm—Nixon & Vanderhye (57) ABSTRACT

A joint sealing key assembly includes a sealing key having a sealing face and one or more posts projecting in a direction away from the sealing face. The sealing key is disposed in a key slot of a first part with the post extending into an opening through the bottom of the key slot. The post includes a laterally opening elongated hole for receiving a lateral pin to retain the sealing key in the slot during assembly. Upon formation of the joint by bringing the seal faces of the first and second parts together, the sealing key is displaced against the bias of a leaf spring thereby retaining the sealing face of the sealing key in sealing engagement with the seal face of the second part.

16 Claims, 7 Drawing Sheets

Fig. 12

SPRING-LOADED JOINT SEALING KEY ASSEMBLY FOR SEALING BETWEEN JOINT SEAL FACES

BACKGROUND OF THE INVENTION

The present invention relates to a spring-loaded joint sealing key assembly for providing sealing pressure between joint seal faces.

In a turbine assembly, there are several locations where spring-loaded sealing key assemblies are required to eliminate or minimize leakage paths between mating faces of a joint. For example, generally semi-circular arcuate upper and lower casings are joined one to the other along a horizontal midline and it is necessary to provide a seal along a potential midline leakage path. For some mating parts, there is insufficient space on the joint to place an existing screw-type spring-loaded assembly because of adjacent machining and/or parts. Solid staked sealing keys have been used where the joint space is scarce. Further, the small scale of conventional sealing assemblies renders the assembly and verification of dimensional requirements difficult, the dimensional requirements being necessary to effect a reliable seal. This problem is compounded when manufacturing in large numbers.

Large screw retained spring-loaded assemblies have also been used as joint sealing key assemblies where joint space is readily available. Particularly, multiple retaining screws are typically installed through the sealing key face and into a slot machined into the joint to be sealed using tapped holes. In joint sealing assemblies of this type, highly accurate detailed measurements are taken to ensure that the sealing key face is sufficiently raised above the joint to be sealed so that when the joint is assembled, the opposing part halves displace the sealing key fully into the key slot. The sealing force is provided by leaf-type springs located under the sealing key. The screws, however, must prevent the sealing key assembly from falling out of the joint during assembly while also affording adequate clearance for sealing key movement. Thus, each screw must be located so that its head lies below the joint interface. Otherwise, the joint parts cannot fully mate. While this joint sealing key assembly is effective, it is difficult to manufacture and install because of the tight tolerances, as well as the intense labor necessary to install the parts.

BRIEF SUMMARY OF THE INVENTION

In accordance with a preferred embodiment of the present invention, there is provided a spring-loaded joint sealing key assembly available for use where joint space is inadequate for conventional screw-type assemblies or is adequate and a key assembly of the present type is desired. The present sealing key minimizes or eliminates needs for preassembly of the sealing key to joint measurements. Drilling and tapping screw holes in a side of one of the joint parts also eliminates any holes formed in the contact face of the sealing key and eliminates retaining screw hole to key wall tolerance considerations. Particularly, the present invention provides a joint sealing key assembly including a generally oblong shaped sealing key with one or more multiple dowel posts projecting from the key in a direction opposite from the sealing key face. Each dowel post has an oblong hole opening laterally generally parallel to the seal face of the parts. Retaining pins, preferably spring dowels, are receivable through holes in the sides of the joint extending generally parallel to the sealing key face for registration with the oblong hole through the post. Further, the underside of the sealing key has a recess for receiving a spring, preferably a leaf spring.

One of the joint parts includes a key slot generally conforming to the peripheral shape of the sealing key. Clearance holes are drilled into the bottom surface of the key slot to provide an opening for receiving the posts of the sealing key. It will be appreciated that the apertures receiving the spring dowels are formed in registration with the oblong holes opening laterally through the key posts. The depth of the key slot is also formed to fully accommodate the depth of the sealing key.

To install the sealing key, the leaf springs are placed into the sealing key slot at a location out of registry with the holes for the posts. The sealing key is then placed into the sealing key slot, resting on the springs in an uncompressed position. The spring dowels are then placed into the dowel apertures and translated longitudinally to engage the post holes on the sealing key. It will be appreciated that the dowels retain the sealing key in an uncompressed condition in the key slot during assembly. Upon assembly of the joint halves, the sealing face of the sealing key is engaged by the sealing face of the other part and the sealing key is displaced into a final compressed position within the key slot. Thus, the sealing face of the sealing key and the seal face of the adjoining part form a seal.

In a preferred embodiment according to the present invention, there is provided a joint sealing key assembly comprising first and second parts having respective joint seal faces, the first part having a slot opening through the joint seal face thereof, a joint sealing key receivable in the slot and having a sealing face and a recess along a side thereof remote from said sealing face, the joint sealing key including a hole opening laterally through one side thereof, a spring in the recess and cooperable between the joint sealing key and the first part for biasing the joint sealing key in a direction toward the second part, the first part having at least one aperture opening laterally into the slot and in alignment with the hole in the joint sealing key when the joint sealing key is received in the slot and a pin received through the aperture and in the hole for retaining the joint sealing key in the slot with the spring biasing the sealing face of the joint sealing key into sealing engagement with the seal face of the second part.

In a further preferred embodiment according to the present invention, there is provided a joint sealing key assembly comprising first and second parts having respective joint seal faces, the first part having a slot opening through the joint seal face thereof, a joint sealing key receivable in the slot and having a sealing face, the joint sealing key including a hole opening laterally through one side thereof, a spring cooperable between the joint sealing key and the first part for biasing the joint sealing key in a direction toward the second part, the first part having at least one aperture opening laterally into the slot and in alignment with the hole in the joint sealing key when received in the slot, the hole having an extent in a direction toward the second part greater than an extent of the aperture in the direction and a pin received through the aperture and in the hole for retaining the joint sealing key in the slot while enabling the spring to bias the joint sealing key for movement in the direction to sealingly engage the sealing face of the joint sealing key with the seal face of the second part.

DETAILED DESCRIPTION OF THE INVENTION

Figure 1:
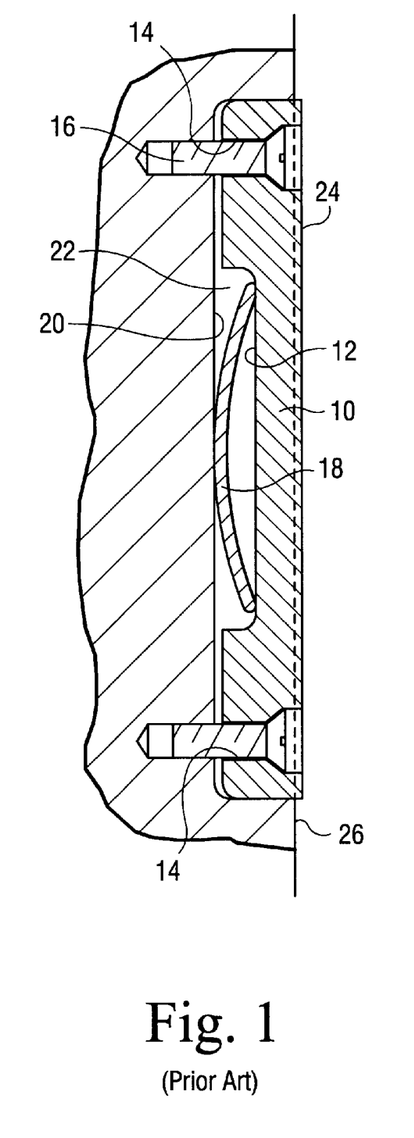
FIG. 1 is a fragmentary cross-sectional view of a prior art sealing key assembly in an uncompressed condition.
Figure 2:
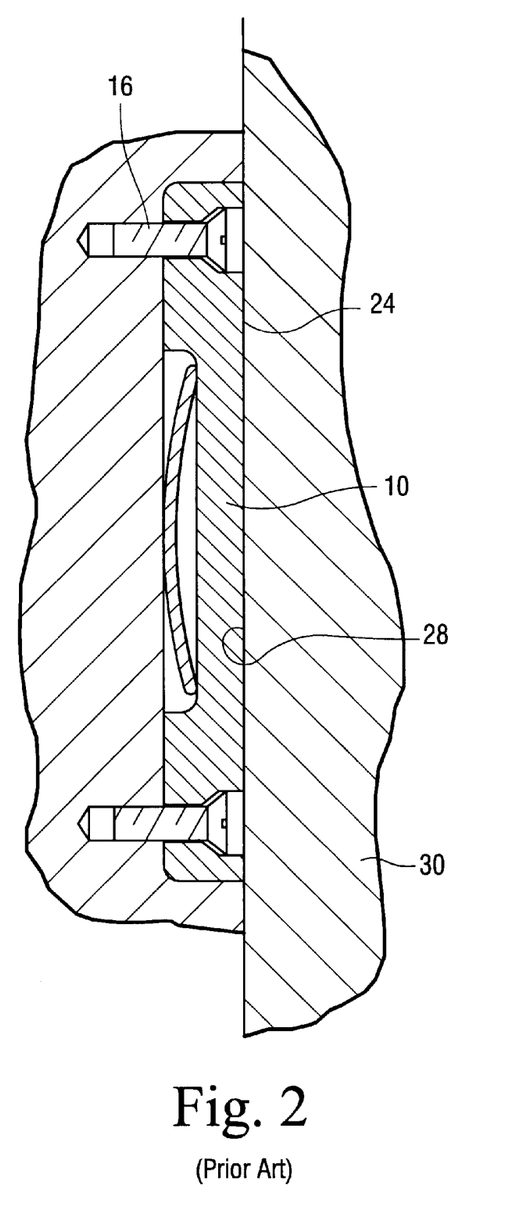
FIG. 2 is a view similar to FIG. 1 illustrating the prior art sealing key in a compressed condition sealing against the seal face of the second part.

Referring now to the drawings, particularly to the prior art sealing key assemblies illustrated in FIGS. 1 and 2, the joint sealing key 10 includes a recess 12 along its bottom surface and a pair of openings 14 adjacent opposite ends for receiving screws 16. A leaf spring 18 is disposed in the recess 12 and bears against the bottom 20 of the key slot 22. In FIG. 1, the sealing key 10 is illustrated in an uncompressed condition with its seal face 24 spaced outwardly of the seal face 26 of the part to which the sealing key 10 is loosely secured.

In FIG. 2, the sealing key 10 is illustrated in a compressed condition with its seal face 24 bearing against the sealing face 28 of the adjoining part 30. It will be appreciated that the heads of screw 16 are located below the seal face of part 26 in the compressed condition so as not to interfere with the sealing between the seal face 28 and sealing face 24.

Figure 3:
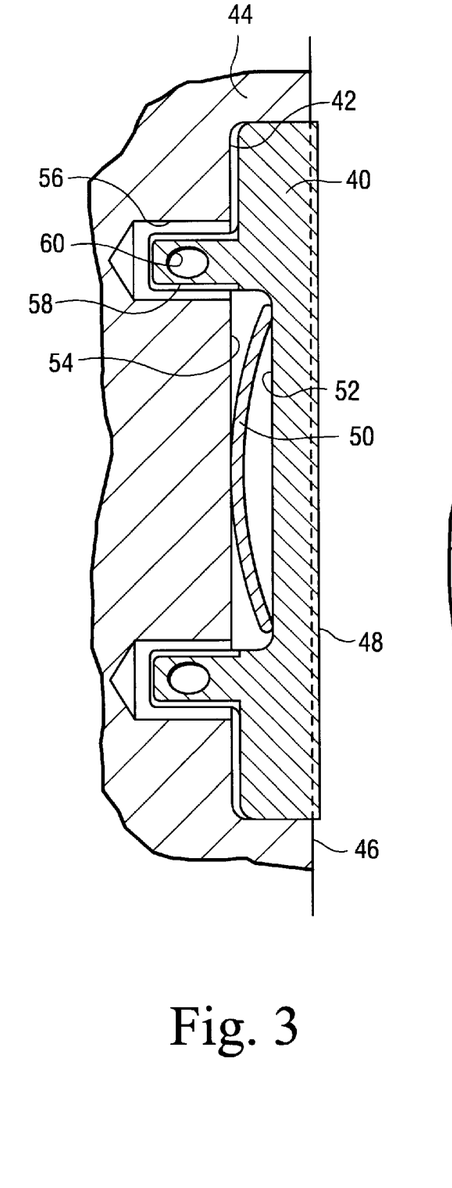
FIG. 3 is a fragmentary cross-sectional view of a spring-loaded joint sealing key assembly according to a preferred embodiment of the present invention and illustrated in an uncompressed retained position.
Figure 4:
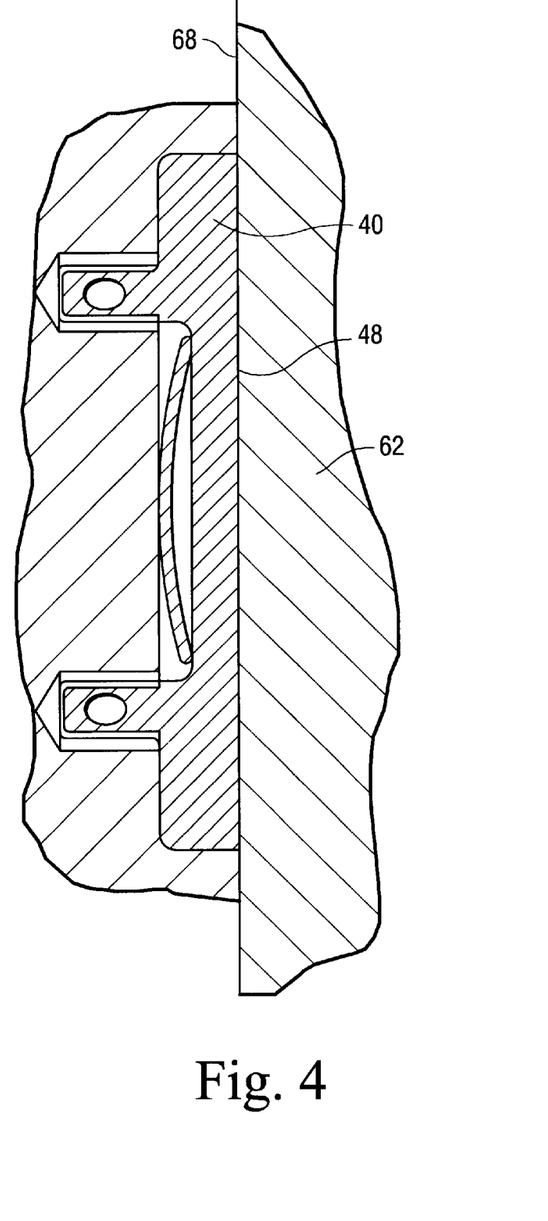
FIG. 4 is a view similar to FIG. 3 illustrating the joint sealing key in its sealing compressed condition.

Referring now to a preferred embodiment of the present invention as illustrated in FIGS. 3–6, there is provided a sealing key 40 for disposition in a key slot 42 in a first part 44 having a seal face 46. Sealing key 40 is illustrated in FIG. 3 in an uncompressed or assembly condition having a sealing face 48 raised above or spaced outwardly of the seal face 46 of the first part 44. A leaf spring 50 is disposed in a slot or recess 52 along the underside of the sealing key 40 and engages against the bottom surface 54 of key slot 42. In the illustrated form, a pair of clearance openings 56 are provided through the bottom 54 opening into recess 42 at spaced positions along slot 42.

Sealing key 40 includes a pair of posts 58 projecting in a direction away from sealing face 48 for reception in the respective openings 56. Each post 58 has a hole 60 opening laterally of the sealing key 40. For reasons discussed below, the holes 60 are generally oblong in shape, e.g., having a length in a direction toward the sealing face 48 and the second part 62 in excess of their width, i.e., in a direction parallel to sealing face 48.

Figure 5:
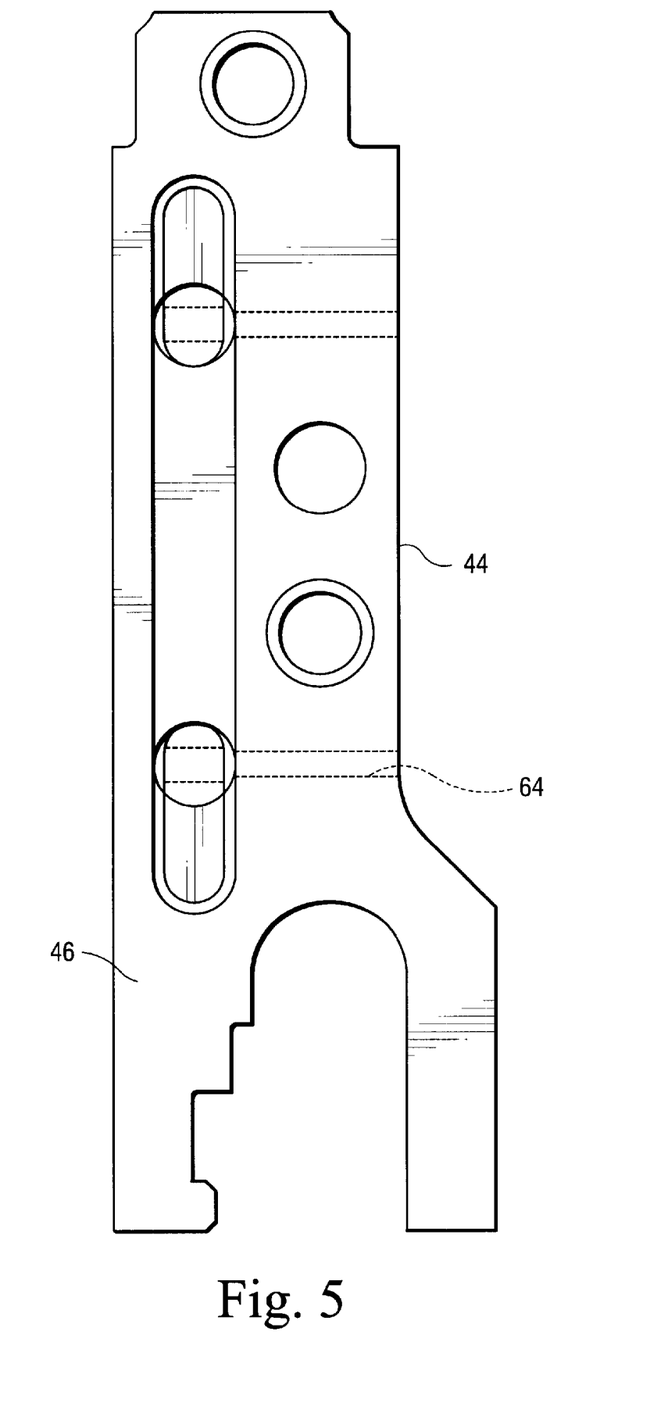
FIG. 5 is an end elevational view of the sealing key slot in the first part of the joint.
Figure 6:
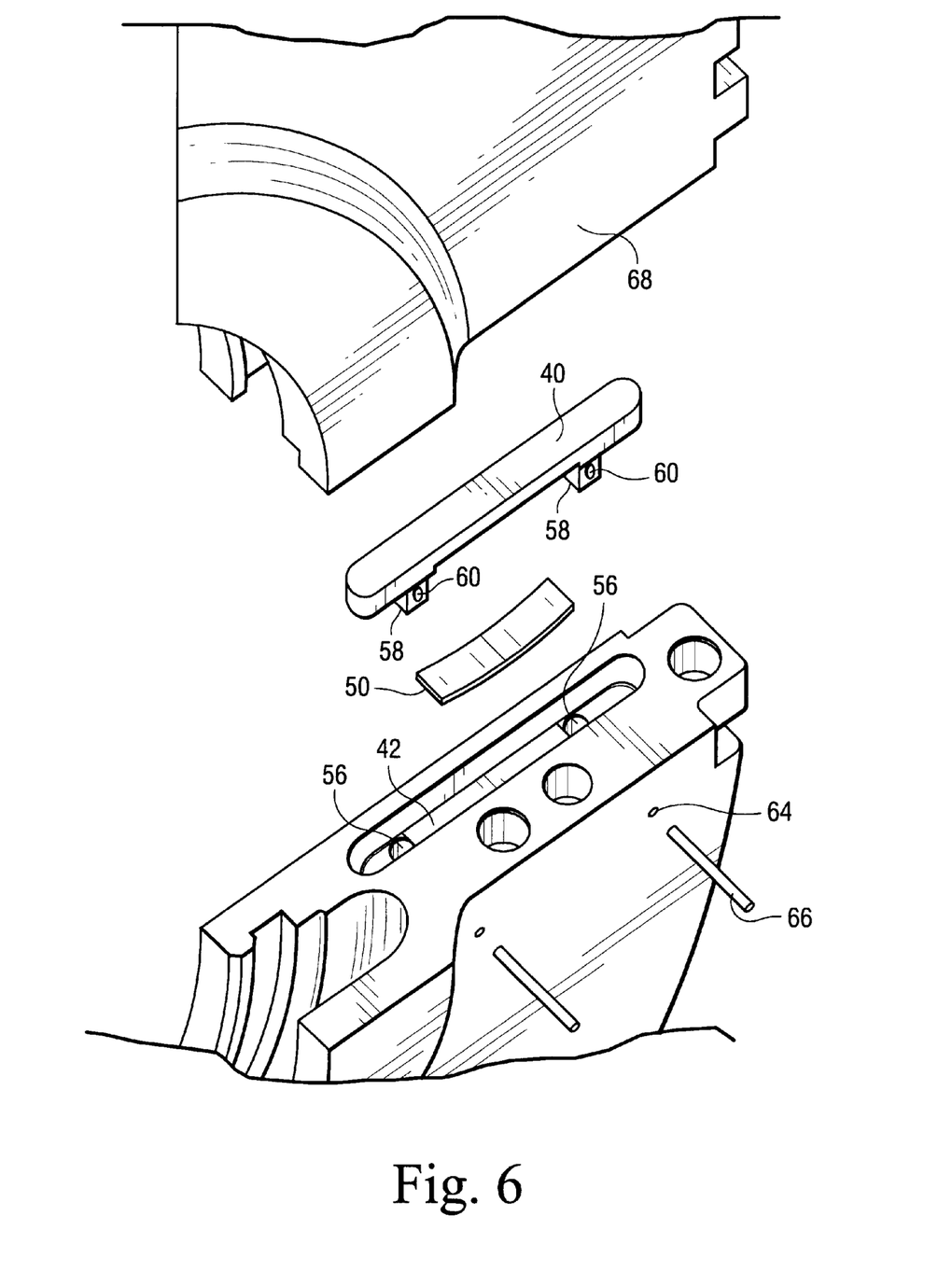
FIG. 6 is a fragmentary perspective view illustrating the various parts of the joint sealing key assembly and joint.
Figure 7:
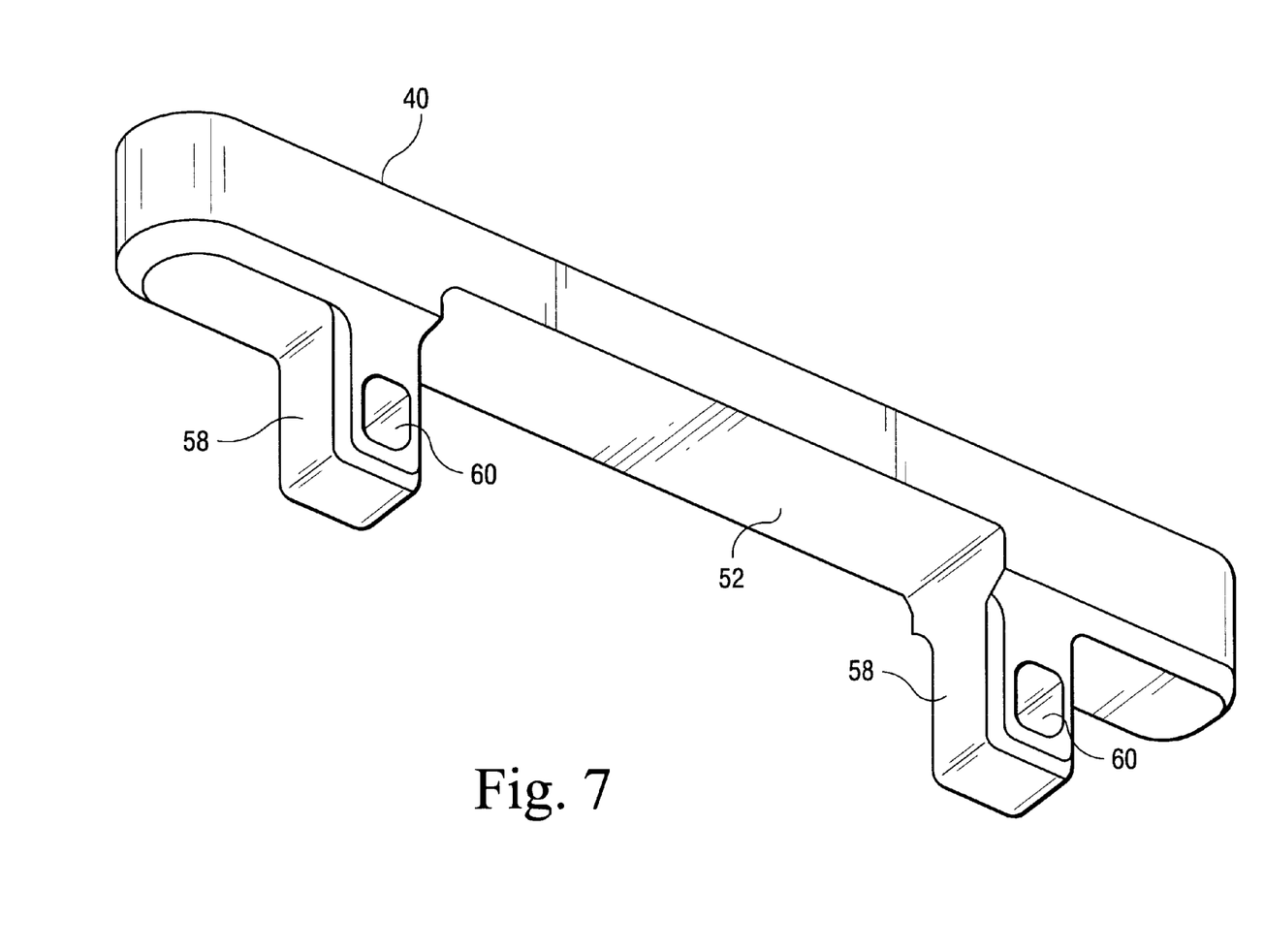
FIG. 7 is a perspective view of a sealing key according to a preferred embodiment of the present invention.

Referring to FIGS. 5 and 6, a pair of laterally extending apertures 64 open through a side face of the first part 44. Each of the apertures 64 opens into the opening 56 which receives the post 58. As illustrated in FIG. 6, pins 66 are receivable within the apertures 64 and into the openings 60 through the posts 58. The pins 66 are preferably spring dowels. A spring dowel is a coiled spring about a long axis whereby the diameter of the dowel can be reduced for insertion into the aperture 64 and released for expansion to engage the aperture 64, retaining the spring dowel in the aperture 64. It will be appreciated from a review of FIGS. 3 and 4 that the depth of the sealing key 40 is sufficient to allow movement of the sealing key 40 between uncompressed and compressed positions depicted in FIGS. 3 and 4, respectively. The longitudinal extent of the openings 60 in posts 58 is such as to permit reception of the inner ends of the pins or spring dowels 66 when the sealing key 40 lies in the uncompressed position illustrated in FIG. 3. The extent is also sufficient such that when the sealing key 40 lies in the compressed condition illustrated in FIG. 4, the inner ends of the pins 66 likewise engage in the openings 60. The pins 66 therefore retain the sealing key 40 in the key slot 42 in the uncompressed condition during installation. The leaf spring 50 is an arched leaf-type spring with a thickness and radius based on the spring force required to seal the joint. The length of the spring 50 is based on the size of the slot 52 in the sealing key 40. The width of the spring 50 is equal to the width to the sealing key 40.

To install the sealing key 40, the leaf spring 50 is located in the key slot 42 at a location out of registry with the openings 56 and in registry with the recess 52 of a sealing key 40. The sealing key 40 is then placed into the sealing key slot resting on the spring in the uncompressed position and with the posts 58 received in the openings 56. The pins 66, e.g., spring dowels, are inserted into the apertures 64 and engage within the post openings 60 on the sealing key 40. Particularly, the pins 66 engage the innermost ends of the post openings 60. The sealing key 40 is thus retained in the key slot 42 with the leaf spring 50 biasing the sealing key 40 to the uncompressed condition illustrated in FIG. 3. The dowel pins 66 engage the posts 58 at the innermost ends of openings 60. Any excess length of the pins 66 outwardly of the part 44 may be cut away.

The two parts, i.e., the first and second parts 44 and 62, respectively, are then assembled. In that assembly, the engagement of the seal faces 46 and 68 of the first and second parts 44 and 62, respectively, displaces the sealing key 40 into its compressed condition illustrated in FIG. 4. In that condition, the sealing face 48 of sealing key 40 seals against the seal face 68 of the second part 62.

By the foregoing sealing key assembly, it will be appreciated that there is no need for drilling and tapping screw holes. Also, the sealing face 48 is smooth and continuous and is not interrupted by any screw or bore holes.

Figure 8:
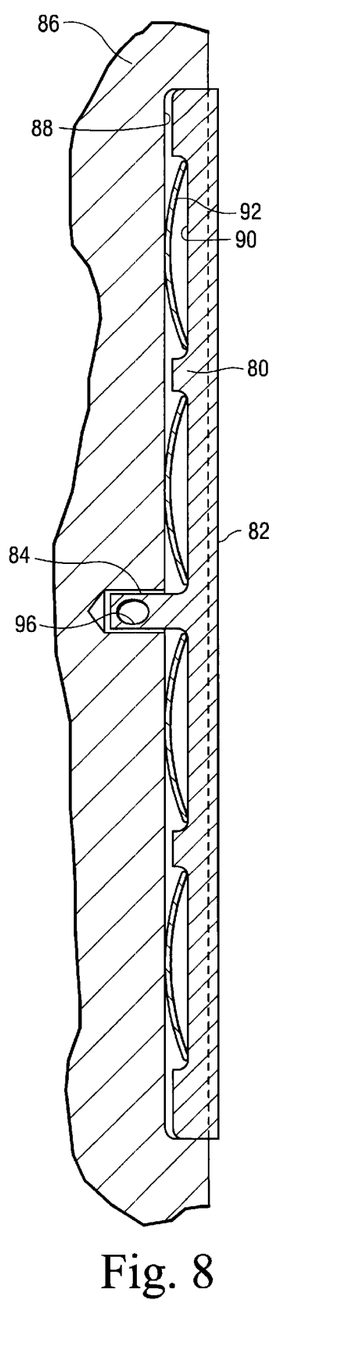
FIGS. 8–12 are fragmentary cross-sectional views of various forms of a joint sealing key assembly according to the present invention.

It will also be appreciated that the sealing key assembly must be sufficiently flexible to provide for varying lengths and numbers of key springs and retaining pins depending upon the configuration of the joint in which the sealing key is to be used. Thus, various configurations of the sealing key assemblies are provided. For example, as illustrated in FIG. 8, there is provided an elongated sealing key 80 having a sealing face 82 and a single centrally located post 84 extending in a direction away from the sealing surface 82. The first sealing part 86 includes a key slot 88 for receiving the sealing key 80. A plurality of recesses 90 are provided along the underside of the sealing key 80 for receiving and retaining leaf springs 92. As illustrated, a pair of recesses and leaf springs are provided on opposite sides of post 84, post 84 including a lateral opening 96 for receiving an appropriate pin, such as pin 66, through the side of part 86.

Figure 9:
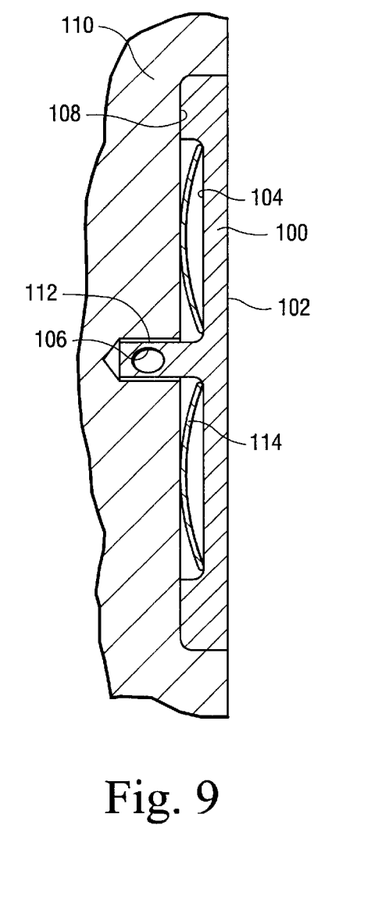

In the embodiment illustrated in FIG. 9, the sealing key 100 includes a sealing face 102 and a recess 104 opposite from the sealing face 102 and along its underside, the recesses 104 lying on opposite sides of a post 106 projecting away from sealing face 102. Sealing key 100 is received in a key slot 108 formed in the first joint part 110, the joint part also having at least one lateral aperture, not shown, along a side thereof for receiving a pin 66 for reception in opening 112 in post 106. A leaf spring 114 is provided in each recess 104 to bias the sealing key toward the second part.

Figure 10:
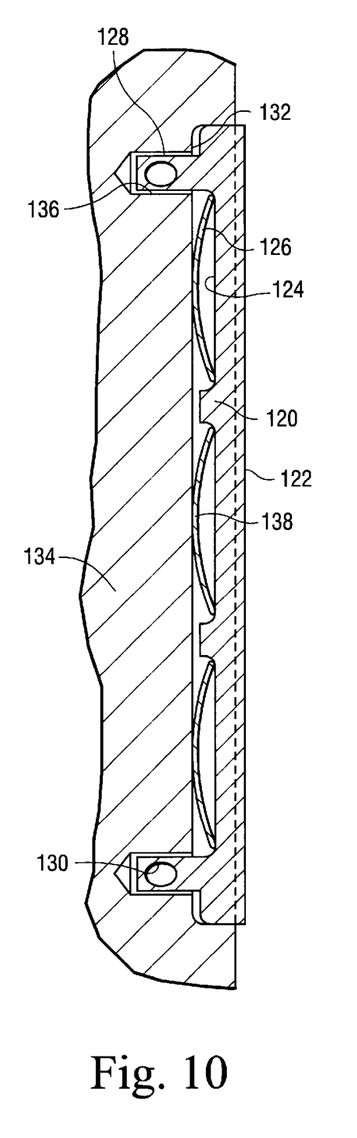

In FIG. 10, the sealing key 120 has a sealing face 122 and a plurality, three being shown, of spaced recesses 124 along its underside for receiving leaf springs 126. Sealing key 120 also has a pair of posts 128 adjacent opposite ends projecting away from sealing face 122. The posts 128 have lateral openings 130. The sealing key 120 is received in a key slot 132 of part 134 with the posts 128 received in openings 136 through the bottom of the key slot 132. A side of part 134 has a pair of apertures for receiving retaining pins such as dowel pins 66 as in the preceding embodiments for retaining the sealing key 120 in slot 132 in the uncompressed condition. Leaf springs 138 in each recess 124 bias the sealing key outwardly toward the second part.

Figure 11:
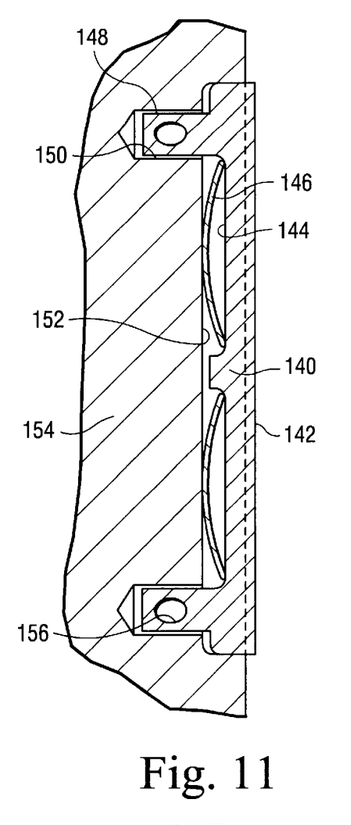

Referring to the embodiment illustrated in FIG. 11, the sealing key 140 has a sealing face 142 and a pair of recesses 144 along its underside for receiving respective leaf springs 146. Sealing key 140 includes a pair of posts 148 adjacent opposite ends for reception in openings 150 formed through the bottom of the key slot 152 in part 154. Each part includes a lateral opening 156 for receiving a retaining pin, such as dowel pin 66, for similar purposes as described.

Figure 12:
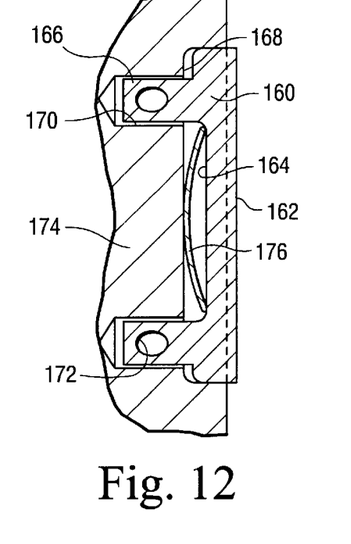

Referring to the embodiment illustrated in FIG. 12, the sealing key 160 includes a sealing face 162 and a recess 164 lying between a pair of posts 166 projecting away from the sealing face 162. The sealing key 160 is received in a key slot 168 having openings 170 for receiving the posts 166. The posts 166 have elongated openings 172 for receiving pins similar to pins 66 through laterally extending apertures in the part 174. Spring 176 biases the sealing key 160 for movement in a direction toward the second part.

In all of the embodiments hereof, it will be appreciated that the one or more leaf springs bias the sealing key for movement outwardly of the seal face of the joint part having the key slot and in which the sealing key is retained by the pins 66. Thus, the sealing face of the sealing key projects outwardly beyond the seal face of the first part in an uncompressed condition prior to completion of the joint formed between the first and second parts. When the second part is juxtaposed relative to the first part, the sealing key is compressed against the leaf springs by engagement between the seal faces of the two joint parts whereby the sealing face of the sealing key is in sealing engagement against the seal face of the second part. In all embodiments, the sealing key is retained in the slot in the uncompressed condition by the engagement of the pin in the elongated openings of the sealing key posts to facilitate assembly and to avoid any interruption of the sealing face of the sealing key, for example, by openings for screws.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A joint sealing key assembly comprising:
   first and second parts having respective, generally planar, joint seal faces;
   said first part having a slot opening through said joint seal face thereof;
   a joint sealing key receivable in said slot and having a generally planar sealing face generally parallel to said planar joint seal faces and a recess along a side thereof remote from said sealing face, said joint sealing key including a hole extending generally parallel to said planar sealing face of said sealing key and opening laterally through one side thereof;
   a spring in said recess and cooperable between said joint sealing key and said first part for biasing said joint sealing key in a direction toward said second part;
   said first part having at least one aperture extending generally parallel to said planar joint seal face thereof and opening laterally into said slot and in alignment with said hole in said joint sealing key when said joint sealing key is received in said slot; and
   a pin received through said aperture and in said hole for retaining said joint sealing key in said slot with said spring biasing said sealing face of said joint sealing key into sealing engagement with the seal face of said second part.

2. A joint sealing key assembly according to claim 1 wherein said hole has an extent in a direction toward said seal face of said second part greater than an extent of said pin in said direction enabling said joint sealing key for movement in said slot toward and away from a bottom of said slot.

3. A joint sealing key assembly comprising:
   first and second parts having respective joint seal faces;
   said first part having a slot opening through said joint seal face thereof;
   a joint sealing key receivable in said slot and having a sealing face and a recess along a side thereof remote from said sealing face, said joint sealing key including a hole opening laterally through one side thereof;
   a spring in said recess and cooperable between said joint sealing key and said first part for biasing said joint sealing key in a direction toward said second part;
   said first part having at least one aperture opening laterally into said slot and in alignment with said hole in said joint sealing key when said joint sealing key is received in said slot; and
   a pin received through said aperture and in said hole for retaining said joint sealing key in said slot with said spring biasing said sealing face of said joint sealing key into sealing engagement with the seal face of said second part;
   said joint sealing key including at least one post projecting therefrom in a direction away from said sealing face, said first part including an opening for receiving said post upon receiving said joint sealing key in said slot.

4. A joint sealing key assembly according to claim 3 wherein said hole in said joint sealing key opens through a side of said post whereby said pin is received through said aperture and into said post hole.

5. A joint sealing key assembly according to claim 4 wherein said hole is elongated in the direction toward said second seal face.

6. A joint sealing key assembly according to claim 5 wherein said pin comprises a spring coiled about an axis corresponding with axes of said aperture and said hole whereby said coiled spring is biased outwardly to engage walls of said aperture and said hole to retain said pin therein.

7. A joint sealing key assembly comprising:
   first and second parts having respective joint seal faces;
   said first part having a slot opening through said joint seal face thereof;

a joint sealing key receivable in said slot and having a sealing face and a recess along a side thereof remote from said sealing face, said joint sealing key including a hole opening laterally through one side thereof;

a spring in said recess and cooperable between said joint sealing key and said first part for biasing said joint sealing key in a direction toward said second part;

said first part having at least one aperture opening laterally into said slot and in alignment with said hole in said joint sealing key when said joint sealing key is received in said slot; and a pin received through said aperture and in said hole for retaining said joint sealing key in said slot with said spring biasing said sealing face of said joint sealing key into sealing engagement with the seal face of said second part;

said joint sealing key including a pair of posts projecting therefrom in a direction away from said sealing face, said posts being spaced from one another and defining said recess therebetween, said first part including a pair of openings for receiving said posts upon receiving said joint sealing key in said slot.

8. A joint sealing key assembly according to claim 7 including a pair of recesses between said posts and a pair of springs in said recesses between said posts, said springs comprising leaf springs engaging between said first part and said joint sealing key.

9. A joint sealing key assembly comprising:

first and second parts having respective joint seal faces;

said first part having a slot opening through said joint seal face thereof;

a joint sealing key receivable in said slot and having a sealing face and a recess along a side thereof remote from said sealing face, said joint sealing key including a hole opening laterally through one side thereof;

a spring in said recess and cooperable between said joint sealing key and said first part for biasing said joint sealing key in a direction toward said second part;

said first part having at least one aperture opening laterally into said slot and in alignment with said hole in said joint sealing key when said joint sealing key is received in said slot; and a pin received through said aperture and in said hole for retaining said joint sealing key in said slot with said spring biasing said sealing face of said joint sealing key into sealing engagement with the seal face of said second part;

said joint sealing key including at least one post projecting therefrom in a direction toward a bottom of said slot, said bottom including an opening for receiving said post upon receiving said joint sealing key in said slot, a pair of recesses along a side of said joint sealing key remote from said sealing face thereof and on opposite sides of said post, and a leaf spring in each said recess for biasing said joint sealing key toward said second part.

10. A joint sealing key assembly comprising:

first and second parts having respective, generally planar, joint seal faces;

said first part having a slot opening through said joint seal face thereof;

a joint sealing key receivable in said slot and having a generally planar sealing face generally parallel to said planar joint seal faces, said joint sealing key including a hole extending generally parallel to said planar sealing face of said sealing key and opening laterally through one side thereof;

a spring cooperable between said joint sealing key and said first part for biasing said joint sealing key in a direction toward said second part;

said first part having at least one aperture extending generally parallel to said planar joint seal face thereof and opening laterally into said slot and in alignment with said hole in said joint sealing key when received in said slot, said hole having an extent in a direction toward said second part greater than an extent of said aperture in said direction; and a pin received through said aperture and in said hole for retaining said joint sealing key in said slot while enabling said spring to bias said joint sealing key for movement in said direction to sealingly engage said sealing face of said joint sealing key with the seal face of said second part.

11. A joint sealing key assembly according to claim 10 wherein said hole has an extent in a direction toward said second seal face greater than an extent of said pin in said direction enabling said joint sealing key for movement in said slot toward and away from a bottom of said slot.

12. A joint sealing key assembly comprising:

first and second parts having respective joint seal faces;

said first part having a slot opening through said joint seal face thereof;

a joint sealing key receivable in said slot and having a sealing face, said joint sealing key including a hole opening laterally through one side thereof;

a spring cooperable between said joint sealing key and said first part for biasing said joint sealing key in a direction toward said second part;

said first part having at least one aperture opening laterally into said slot and in alignment with said hole in said joint sealing key when received in said slot, said hole having an extent in a direction toward said second part greater than an extent of said aperture in said direction; and a pin received through said aperture and in said hole for retaining said joint sealing key in said slot while enabling said spring to bias said joint sealing key for movement in said direction to sealingly engage said sealing face of said joint sealing key with the seal face of said second part;

said joint sealing key including at least one post projecting therefrom in a direction away from said sealing face, said first part including an opening in said slot for receiving said post upon receiving said joint sealing key in said slot.

13. A joint sealing key assembly according to claim 12 wherein said hole in said joint sealing key opens through a side of said post whereby said pin is received through said aperture and into said post hole.

14. A joint sealing key assembly according to claim 13 wherein said pin comprises a spring coiled about an axis corresponding with axes of said aperture and said hole whereby said coiled spring is biased outwardly to engage walls of said aperture and said hole to retain said pin therein.

15. A joint sealing key assembly comprising:

first and second parts having respective joint seal faces;

said first part having a slot opening through said joint seal face thereof;

a joint sealing key receivable in said slot and having a sealing face, said joint sealing key including a hole opening laterally through one side thereof;

a spring cooperable between said joint sealing key and said first part for biasing said joint sealing key in a direction toward said second part;

said first part having at least one aperture opening laterally into said slot and in alignment with said hole in said joint sealing key when received in said slot, said hole having an extent in a direction toward said second part greater than an extent of said aperture in said direction; and a pin received through said aperture and in said hole for retaining said joint sealing key in said slot while enabling said spring to bias said joint sealing key for movement in said direction to sealingly engage said sealing face of said joint sealing key with the seal face of said second part;

said joint sealing key including a pair of posts projecting therefrom in a direction toward a bottom of said slot, said posts being spaced from one another, said slot bottom including a pair of openings for receiving said posts upon receiving said joint sealing key in said slot.

16. A joint sealing key assembly according to claim 15 wherein said spring is disposed between said posts.

* * * * *